United States Patent
Jokschas et al.

(10) Patent No.: US 10,583,376 B2
(45) Date of Patent: Mar. 10, 2020

(54) SPIN-ON FILTER FOR A FILTERING DEVICE FOR FLUID, FILTERING DEVICE, AND FILTER HEAD

(71) Applicant: Mann+Hummel GMBH, Ludwigsburg (DE)

(72) Inventors: Guenter Jokschas, Murrhardt (DE); Ercan Sancar, Asperg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 703 days.

(21) Appl. No.: 14/990,912

(22) Filed: Jan. 8, 2016

(65) Prior Publication Data

US 2016/0193551 A1    Jul. 7, 2016

Related U.S. Application Data

(63) Continuation of application No. PCT/EP2014/064548, filed on Jul. 8, 2014.

(30) Foreign Application Priority Data

Jul. 12, 2013   (DE) .................... 10 2013 011 622

(51) Int. Cl.
*B01D 27/08* (2006.01)
*B01D 35/30* (2006.01)
(Continued)

(52) U.S. Cl.
CPC .......... *B01D 27/08* (2013.01); *B01D 35/005* (2013.01); *B01D 35/306* (2013.01); *F02M 37/22* (2013.01); *B01D 2201/347* (2013.01)

(58) Field of Classification Search
CPC ..... B01D 27/08; B01D 35/306; B01D 35/005; B01D 2201/347; F02M 37/22
See application file for complete search history.

(56) References Cited

U.S. PATENT DOCUMENTS 3,325,015 A    6/1967   Hathaway
4,832,844 A    5/1989   Ayers
(Continued)

FOREIGN PATENT DOCUMENTS

DE           4432529 A1    3/1996
DE       102008004181 A1    7/2008
(Continued)

*Primary Examiner* — Krishnan S Menon
*Assistant Examiner* — Waqaas Ali
(74) *Attorney, Agent, or Firm* — James Hasselbeck (57) ABSTRACT

A spin-on filter for a filtering device for fluid, the spin-on filter including a housing pot, in which a filter element is arranged; a connecting body, which is arranged on an end face of the housing pot having a central opening; and a fluid opening that is radially outwardly offset in relation to the central opening; a filter-side coupling part of a coupling device for detachably coupling the spin-on filter to a filter head of the filtering device, the coupling part being arranged on the central opening; wherein the filter-side coupling part is configured to be detachably coupled to a connector of a head-side coupling part of the filter head of the filtering device by a plug-in and/or rotational movement with respect to a coupling axis; wherein at the end face an outer seal is provided, which extends around the periphery of the central opening and the fluid opening.

19 Claims, 4 Drawing Sheets

(51) Int. Cl.
    *B01D 35/00*    (2006.01)
    *F02M 37/22*    (2019.01)

(56) References Cited

U.S. PATENT DOCUMENTS

| | | | |
|---|---|---|---|
| 6,023,834 | A | 2/2000 | Brown et al. |
| 6,936,084 | B2 | 8/2005 | Schlensker et al. |
| 7,434,697 | B2 | 10/2008 | Bagci et al. |
| 9,151,449 | B2 | 10/2015 | Sakai |
| 9,205,354 | B2 | 12/2015 | Thienel |
| 2003/0019819 | A1 | 1/2003 | Fritze |
| 2008/0245719 | A1 | 10/2008 | Beard et al. |
| 2009/0008317 | A1 | 1/2009 | Mules |
| 2011/0303604 | A1 | 12/2011 | McKenzie |
| 2012/0180750 | A1* | 7/2012 | Thienel .................. B01D 27/08 123/196 A |
| 2012/0261323 | A1* | 10/2012 | Badeau .................. B01D 27/08 210/232 |
| 2014/0217001 | A1 | 8/2014 | Vercammen |

FOREIGN PATENT DOCUMENTS

| | | | |
|---|---|---|---|
| DE | 102011009925 | A1 | 8/2012 |
| EP | 0830885 | A1 | 3/1998 |

\* cited by examiner

SPIN-ON FILTER FOR A FILTERING DEVICE FOR FLUID, FILTERING DEVICE, AND FILTER HEAD

TECHNICAL FIELD

The invention relates to a spin-on filter for a filtering device for fluid, in particular liquid, in particular oil or fuel, in particular of an internal combustion engine, in particular of a motor vehicle.

The invention further relates to a filtering device for fluid, in particular liquid, in particular oil or fuel, in particular of an internal combustion engine, in particular of a motor vehicle.

The invention moreover relates to a filter head of a filtering device for fluid, in particular liquid, in particular oil or fuel, in particular of an internal combustion engine, in particular of a motor vehicle, in particular of a filtering device according to the invention.

BACKGROUND OF THE INVENTION

A filtering device including a filter head and a filter cartridge is known from EP 0 830 885 A1. The filter cartridge is secured to the filter head. The filter head includes a plurality of outwardly extending ramped projections constituting a first component of a bayonet-type coupling. The ramped projections are cooperable with similar projections of the filter cartridge to secure the filter cartridge to the filter head.

SUMMARY OF THE INVENTION

It is the object of the invention to devise a spin-on filter, a filtering device, and a filter head of the type mentioned above, in which securing of the easy-change filter, in particular of the spin-on filter, to the filter head can be simplified. Moreover, a stability of the coupling of the easy-change filter to the filter head is to be improved. Furthermore, sealing of the easy-change filter with respect to the surroundings is to be improved.

This object is achieved according to the invention by the spin-on filter including:
a housing pot, in which a filter element is arranged;
a connecting body, which is arranged at the end face of the housing pot and is provided with a central opening, and in particular with at least one fluid opening that is radially outwardly offset in relation to the central opening;
a filter-side coupling part of a coupling device for detachably coupling the spin-on filter to a filter head of the filtering device, the coupling part being arranged on the central opening,
and wherein the filter-side coupling part can be detachably coupled to a connector of a head-side coupling part of the filter head of the filtering device by way of a plug-in and/or rotational movement with respect to a coupling axis, and wherein at the end face an outer seal is provided, which at least extends around the periphery of the central opening and the at least one fluid opening and which is directed radially outwardly for contact with a radially inwardly directed sealing surface on the filter head side so as to seal a fluid chamber formed between the spin-on filter and the filter head with respect to the surroundings when the spin-on filter is mounted to the filter head.

Such spin-on filters are also known to be referred to as easy-change filters. At least one filter element is arranged in the housing pot of the filter housing in the case of the spin-on-filter. The spin-on filter is replaced entirely together with the filter housing and the at least one filter element contained therein. Advantageously, the at least one filter element may be fixedly arranged in the filter housing.

The head-side coupling part can advantageously be designed as a connector. The head-side coupling part can alternatively also comprise a section that has the function and/or shape of a connector.

The connector can advantageously include a fluid outflow via which the fluid can flow out of the spin-on filter. Alternatively, the connector can also include a fluid inflow via which the fluid from the filter head can reach the spin-on filter. The connector can advantageously be a section of a connection piece, in particular of a connecting sleeve section, of the filter head.

The spin-on filter or the filtering device is in particular designed such that unfiltered fluid is fed on one end face, and the filtered fluid is discharged on the same end face.

Against this background, the at least one fluid opening of the connecting body can advantageously be a fluid inflow opening through which fluid can reach the spin-on filter.

As an alternative, the at least one fluid opening can be a fluid outflow opening through which fluid can exit the spin-on filter.

Alternatively, however, it is also possible for both the untreated fluid and the treated fluid to flow via the central opening into the filter or out of the filter.

The connecting body can advantageously be a connecting plate. The connecting body can advantageously be a cover of a housing of the spin-on filter. The cover can advantageously be used to cover the housing pot.

In an advantageous embodiment, a radially outwardly open seal receiving groove can be formed at least partially by an attachment ring of the connecting body, which can be coupled to the edge of the housing pot in a form-locked manner, and more particularly by way of a shaped crimp.

In this way, the attachment ring may be used not only to couple the connecting body to the housing pot, but also to retain the outer seal. The form-locked connection, in particular the shaped crimp, allows a stable joint to be implemented between the seal receiving groove, and thus the outer seal, and the connecting body. A radially inner base surface of the seal receiving groove can advantageously serve as a radially acting counter bearing for the outer seal.

In a further advantageous embodiment, the outer seal can project axially toward the filter head beyond a circumferential surface section that may adjoin the outer seal radially outwardly on the side of the connecting body which faces the filter head.

In this way, a corresponding sealing surface can project beyond the outer seal in the axial direction on both sides of the filter head. In this way, a larger positional tolerance of the spin-on filter with respect to the filter head can be easily compensated for. The sealing surface on the filter head side can advantageously be arranged on a corresponding head-side outer sealing section. The outer sealing section can axially project beyond the outer seal when the spin-on filter is mounted.

In a further advantageous embodiment, the outer seal can be arranged beneath the side of the form-locked joint facing the filter head between the edge of the housing pot and the attachment ring, in particular of the shaped crimp.

In this way, the outer seal can be arranged in a protected manner radially inside the edge of the housing pot. Moreover, an axial installation space of the spin-on filter may thus be reduced.

In a further advantageous embodiment, the filter-side coupling part can comprise multiple coupling ribs, which can be distributed in the circumferential direction of the coupling axis on the central opening.

The filter-side coupling ribs can cooperate with corresponding head-side coupling ribs or grooves, in particular ramp grooves, for coupling the spin-on filter to the filter head.

The connecting ribs can advantageously be continuous circumferentially with respect to the coupling axis. The coupling ribs can also include interruptions circumferentially with respect to the coupling axis.

The coupling ribs, on the side thereof facing away from the filter head, can advantageously include at least one respective filter-side retaining surface extending obliquely with respect to the coupling axis, and on the side thereof facing the filter head, they can include at least one respective feed ramp extending obliquely with respect to the coupling axis, which can be used to feed head-side retaining surfaces on the head-side coupling part to the filter-side retaining surfaces when the spin-on filter is being mounted to the filter head, while rotating the spin-on filter.

The coupling ribs can advantageously be arranged on a radially inner circumferential side of the connecting body.

The coupling ribs can advantageously project radially inwardly. The coupling ribs can advantageously project radially inwardly into the central opening.

In this way, a stable and compact shape can be implemented. The coupling ribs can be arranged on an inner circumference of the central opening.

Starting sections of the coupling ribs facing the filter head may advantageously be distributed, in particular uniformly distributed, circumferentially with respect to the coupling axis.

In this way, the risk of the spin-on filter tilting during attachment to the filter head can be reduced, and preferably prevented.

Starting sections of the coupling ribs facing the filter head may advantageously be spaced axially, with respect to the coupling axis, from a head-side radially inner edge of the connecting body surrounding the central opening.

In this way, a section of the radially inner circumferential side of the connecting body, which delimits the central opening, can act as an axial insertion aid for the connector on the side of the filter head between the corresponding starting sections of the coupling ribs and the edge of the coupling body.

The starting sections of the coupling ribs facing the filter head can advantageously be arranged with axial offset in relation to the head-side edge of the central opening.

In a further advantageous embodiment, the coupling device can comprise at least one circumferential, with respect to the coupling axis, inner seal.

In a further advantageous embodiment, the inner seal can be arranged offset axially with respect to the coupling axis in relation to the filter-side coupling part toward the interior of the spin-on filter.

Advantageously, the sealing surface of the inner seal can form an at least axial, with respect to the coupling axis, contact for the sealing surface of the head-side fluid connector.

The inner seal can advantageously be coupled to the filter element.

The object is further achieved according to the invention by the filtering device in that the filtering device comprises an easy-change filter, and more particularly a spin-on-filter according to the invention, which comprises:

a housing pot, in which a filter element is arranged;
a connecting body, which is arranged at the end face of the housing pot and is provided with a central opening, and in particular with at least one fluid opening that is radially outwardly offset in relation to the central opening;
a filter-side coupling part of a coupling device for detachably coupling the spin-on filter to a filter head of the filtering device, the coupling part being arranged on the central opening, and wherein the filter-side coupling part can be detachably coupled to a connector of a head-side coupling part of the filter head of the filtering device by way of a plug-in and/or rotational movement with respect to a coupling axis, and wherein at the end face an outer seal is provided, which at least extends around the periphery of the central opening and the at least one fluid opening and which is directed radially outwardly for contact with a radially inwardly directed sealing surface on the filter head side so as to seal a fluid chamber formed between the spin-on filter and the filter head with respect to the surroundings when the spin-on filter is mounted to the filter head.

The at least one outer seal can provide sealing between the filter head and the easy-change filter at least radially with respect to the coupling axis.

The at least one outer seal can advantageously be separated from the coupling parts.

The filtering device is suitable for filtering fluid. In particular liquids, in particular oil or fuel, can be filtered therewith.

The filtering device can be used in internal combustion engines of motor vehicles. It can also be used in different internal combustion engines, in particular industrial motors. The invention can also be used outside of internal combustion engines, in particular in motor vehicle technology.

The filtering device comprises a filter head, on which an easy-change filter can be mounted. The filter head can have at least one inflow and/or at least one outflow for the fluid. The filter head can preferably be rigidly fixed to a frame. The frame can in particular be part of the internal combustion engine and/or of the motor vehicle.

The filter head comprises a head-side coupling part of a coupling device for the easy-change filter. The filter head can advantageously comprise a first coupling part.

The easy-change filter comprises a filter-side coupling part of the coupling device. The easy-change filter can advantageously comprise a second coupling part.

The second coupling part can be detachably coupled to the first coupling part. The coupling device can advantageously be closable and releasable by way of a combined plug-in movement and rotational movement (plug-in and/or rotational movement) with respect to a coupling axis. Combined plug-in/rotational joints are easy and quick to close and open. Moreover, they are robust to tensile loads. In this way, a quick-release fastener can be easily implemented with the coupling device according to the invention, which is easy and quick to close and open.

The at least one outer seal can be used to separate the fluid-conducting areas, and more particularly areas between the easy-change filter and the filter head, from the surroundings in a sealed manner. The at least one outer seal can be located on the dirty side or the clean side of the filter element of the easy-change filter. This depends on the flow direction of the fluid through the easy-change filter.

According to the invention, the at least one outer seal is separated from the coupling parts. The at least one outer seal is thus not coupled directly to one of the coupling parts. At least one further mechanical intermediate component, and more particularly a component of the filter head or a cover body of the easy-change filter, is arranged between the at least one outer seal and the coupling parts. The at least one outer seal and the coupling parts are thus separated by the at least one intermediate component. The at least one intermediate component brings about mechanical coupling between the at least one outer seal and at least one of the coupling parts. At the same time, the at least one intermediate component allows an increase in the freedom of design of both the coupling parts and the at least one outer seal. In this way, a sealing function may be optimized separately from a coupling function. In particular, structural measures for compensating for mechanical loads acting on the at least one outer seal and on the at least one intermediate component may be optimized in each case separately from each other.

In an advantageous embodiment, the at least one outer seal can provide sealing with respect to the coupling axis exclusively in the radial direction. In this way, any potential compression of the at least one outer seal can be substantially independent of a degree with which the coupling device is closed. Mechanical loading of the outer seal can thus be decreased.

In a further advantageous embodiment, the at least one outer seal can be an O-ring seal. Alternatively, an angular, in particular flat, seal may be used. An O-ring seal has the advantage that it is able to roll more easily off the corresponding radially inner and/or radially outer sealing surfaces during a plug-in movement in the direction of the coupling axis. The radial sealing action can be better defined and/or set with the O-ring seal than with a flat seal.

In a further advantageous embodiment, the at least one outer seal can be attached on the easy-change filter side. It can advantageously be seated against the radial inside of a corresponding surface of the easy-change filter. Alternatively, it may also be seated against the radial outside of a corresponding surface of the easy-change filter.

In a further advantageous embodiment, a corresponding sealing surface, with which the at least one outer seal can sealingly cooperate, can be arranged on the filter head side. The sealing surface can be located radially outside or inside the outer seal.

In a further advantageous embodiment, the sealing surface can be arranged on a corresponding outer sealing section on the filter head side. The outer sealing section can advantageously be cylindrical. The outer sealing section can advantageously be coaxial with respect to the coupling axis. A diameter of the sealing surface on the side facing the outer seal can widen in the axial direction toward the end face from which the outer seal is moved toward the sealing surface during coupling of the coupling device. In this way, an insertion of the outer seal into the sealing surface or an attachment of the outer seal onto the sealing surface can be simplified. Moreover, the outer seal can be continuously, in particular uniformly, compressed during the closing process of the coupling device.

In a further advantageous embodiment, the at least one outer seal can be arranged in a seal seat. The seal seat can advantageously be located on the easy-change filter side. The seal seat can advantageously be a sealing groove. The sealing groove can advantageously be open to the radial outside or to the radial inside. The sealing groove can advantageously be arranged on a cover element of the easy-change filter. The cover element can advantageously be annular. Advantageously, the cover element can be a sheet metal ring. The sealing groove can advantageously be implemented by crimping of the sheet metal ring. The cover element can advantageously be coupled to a housing element, in particular a housing pot, of the easy-change filter, in particular by way of a crimp.

On the side facing the open side of the sealing groove, the cover element can comprise a seat, in particular an annular groove, for the outer sealing section of the filter head.

The outer seal can additionally or alternatively also provide axial sealing.

In a further advantageous embodiment, at least one first of the coupling parts can comprise at least two first ramp sections extending helically with respect to the coupling axis, and the second coupling part can comprise at least two second ramp sections extending helically with respect to the coupling axis, which can be guided against each other at least for closing the coupling device.

The first coupling part can advantageously comprise at least two first, in particular head-side, ramp sections that extend helically with respect to the coupling axis. The second coupling part can comprise at least two second, in particular filter-side, ramp sections that extend helically with respect to the coupling axis. By using the helical ramp sections, an installation space-optimized coupling device can be implemented. By each of the coupling parts having at least two respective ramp sections, the ramp sections of the coupling parts can circumferentially abut each other in multiple locations when the coupling parts are plugged together by way of a plug-in movement in the direction of the coupling axis. In this way, the coupling parts can be attached to each other uniformly, in particular without tilting. During a subsequent rotational movement about the coupling axis, the ramp sections of the coupling parts can mutually guide each other. In this way, a closing process can be carried out easily and precisely.

The first ramp sections can advantageously overlap at least over a portion of the circumference. Advantageously, they can delimit a helically extending first, in particular head-side, ramp groove on sides that are axially opposite each other with respect to the coupling axis. The at least one first ramp groove can advantageously have a U-shaped profile. In this way, it can serve as a guide for the second ramp sections on three sides, these being a radially outer or inner side and two axial sides.

So as to close the coupling device, at least one of the second ramp sections can be guided at least partially in one of the first ramp sections. With the aid of the cooperation between the ramp sections and the ramp grooves, it is possible to achieve precise, exact and stable guidance in the axial, radial and circumferential directions during closing of the coupling device. The corresponding second ramp sections can also be retained in a stable manner within the first ramp grooves. It is thus possible to implement a connection that is highly resilient axially with respect to the coupling axis, in particular when it comes to tensile forces.

Multiple helical threads may be implemented by way of the multitude of ramp sections on each of the coupling parts. The coupling device can thus be closed using relatively small rotational movements. Advantageously, the coupling device can be closed by way of a rotational movement of no more than 360°.

The slopes of the helical ramp sections can be uniform, in particular constant. They may also vary along the ramp sections.

The first ramp sections can be identical. However, it is also possible to use differing first ramp sections. Correspondingly, the second ramp sections may be identical or different. The ramp sections of a respective one of the coupling parts can start at the same axial height with respect to the coupling axis. However, they may also start at differing axial heights.

The coupling parts can each be made of a single material or of a material mix. The coupling parts can advantageously be made of plastic material, aluminum and/or sheet metal or comprise such a material. The two coupling parts can be made of the same material or of differing materials.

The easy-change filter can advantageously have a round cross-section. The easy-change filter can advantageously be coaxial with respect to a filter axis. The filter axis can advantageously coincide with the coupling axis. The easy-change filter can advantageously comprise a filter element. The filter element can advantageously comprise a filter medium that is closed circumferentially. The filter medium can advantageously be pleated in a star-shaped or zigzag manner. The filter medium can advantageously be sealingly coupled to an end body, in particular an end cap, on at least one end face. The filter element can advantageously be coaxial with respect to the filter axis. The filter element can advantageously comprise a supporting body. The supporting body can advantageously be a center pipe. The center pipe can advantageously be located in an element interior of the filter element. The center pipe may extend between the end bodies.

Advantageously, the filter-side, in particular second, coupling part may be a carrying and/or supporting part of the easy-change filter, in particular of a housing of the easy-change filter.

Advantageously, the filter-side, in particular second, coupling part can be designed with a cover part for closing the housing of the easy-change filter. The filter-side coupling part can advantageously be integrally joined to the cover part. In this way, a complexity in terms of components can be reduced. The cover part can advantageously include at least one passage, in particular an inlet and/or an outlet, for the fluid into the easy-change filter or out of the same. The cover part can advantageously be fixed to a further housing part, in particular a filter bowl, of the easy-change filter by way of a fixation element. The fixation element can advantageously comprise a sheet metal ring, which may be coupled to the further housing part. The sheet metal ring can advantageously be coupled to the further housing part by way of a crimped joint.

The coupling device can advantageously comprise at least one stop. The at least one stop can be used to prevent the coupling device from being moved beyond the closed position thereof during the plug-in and/or rotational movement. In this way, the closed position can be precisely defined. At least one of the stops can be located at the end of one of the ramp grooves. In this way, the corresponding facing end of the ramp section guided in the corresponding ramp groove can abut the stop and thus prevent further rotation.

Advantageously, each of the two coupling parts can have at least two ramp sections that extend helically with respect to the coupling axis. The ramp sections of the same coupling part can overlap over at least part of the circumference with respect to the coupling axis. The ramp sections of the same coupling part can each delimit a helically extending ramp groove on sides that are axially opposite each other with respect to the coupling axis. So as to close the coupling device, each of the coupling parts can guide at least one of the ramp sections at least partially in one of the ramp grooves of the respective other coupling part.

The coupling device can advantageously be located between a dirty side and a clean side of a filter element of the easy-change filter. The coupling device can thus advantageously be arranged within an outer seal, which can then seal the fluid-conducting area of the filtering device with respect to the surroundings. A retaining function/coupling function of the coupling device, and a sealing function between the fluid-conducting area of the filtering device and the surroundings, can thus be separated from each other. In this way, the retaining function/coupling function and the sealing function can each be optimized, in particular independently of one another.

Advantageously, at least one of the first ramp sections can comprise, outside the corresponding first ramp groove, an insertion ramp surface which can transition into the corresponding first ramp groove. The insertion ramp surface can serve as an insertion aid so as to achieve exact insertion of the respective second ramp sections into the corresponding ramp grooves.

At least one of the insertion ramp surfaces can advantageously extend helically with respect to the coupling axis. In this way, guidance of the corresponding second ramp sections during the plug-in and/or rotational movement for closing/opening the coupling device can be improved.

Advantageously, the at least one insertion ramp surface can transition steplessly into the corresponding ramp groove. In this way, uniform guidance can be achieved. Advantageously, the at least one insertion ramp surface can be arranged on the side of the at least one first ramp section which axially faces the second coupling part.

Advantageously, at least two of the first ramp sections can be circumferentially offset in relation to each other at least in some sections In this way, each of the second ramp sections can be placed against a corresponding insertion ramp surface when the coupling parts are plugged into each other in any rotational orientation of the easy-change filter with respect to the filter head. Guidance of the ramp sections can thus be achieved in any rotational position of the easy-change filter relative to the filter head.

Advantageously, at least one of the first ramp sections may extend over only a portion of the circumference with respect to the coupling axis. In this way, the coupling device can be opened or closed by way of a rotation of the easy-change filter of no more than 360° relative to the filter head. The coupling device can be opened and closed quickly in this way.

Advantageously, at least the first ramp sections can each extend across the same angle of circumference. The coupling device can thus be symmetrical with respect to the coupling axis. In this way, the easy-change filter can be mounted to the filter head in multiple rotational orientations. During closing of the coupling device, it is easier to find a starting position from which controlled closure of the coupling device is possible. The attachment of the easy-change filter can thus be simplified.

Advantageously, an angle of circumference, across which each of the ramp grooves extends circumferentially, can correspond approximately to an angle of 360° divided by the number of first ramp sections. This can improve the symmetry of the coupling device. Mounting of the easy-change filter can be further simplified. Moreover, the circumferential extension of the ramp grooves in relation to the overall size of the coupling device can thus be optimized. It is thus possible to simplify the coupling device as a whole. Moreover, the guidance and retention of the corresponding second ramp sections during assembly of the coupling device can be improved.

Advantageously, three first, in particular head-side, ramp sections may be provided in each case. Advantageously, three second, in particular filter-side, ramp sections may be provided in each case. Three ramp sections allow the second coupling part to be easily and precisely applied, guided and retained.

The second ramp sections can advantageously each extend across the same angle of circumference as the ramp grooves. In this way, each of the second ramp sections can be lowered completely into the corresponding ramp grooves. The ramp grooves can implement a force transmission across the entire circumferential extension thereof, together with the second ramp sections. The mechanical load-bearing capacity of the coupling device can thus be improved.

If three first ramp sections are used, the corresponding ramp grooves can advantageously each extend across an angle of circumference of approximately between 100° and 140°, and preferably 120°. The ramp grooves can thus overall encompass the entire circumference. In this way, the coupling parts can be coupled along the entire circumference.

Advantageously, an angle of circumference, across which each of the insertion ramp surfaces extends, can correspond approximately to an angle of 360° divided by the number of first ramp sections. Advantageously, the second ramp sections can each extend across the same angle of circumference as the insertion ramp surfaces of the first ramp sections. The second ramp sections can thus each be uniformly and precisely placed against the corresponding insertion ramp surfaces and guided there.

If three first ramp sections are used, the three second ramp sections can advantageously each extend across an angle of circumference of approximately between 100° and 140°, and preferably 120°.

Advantageously, the first ramp sections can circumferentially delimit half of each insertion ramp surface and half of each ramp groove. In this way, the second ramp sections can be uniformly seated against and be guided on the insertion ramp surfaces. Moreover, the second ramp sections can be held half in the ramp grooves approximately across the entire circumferential extension of the same. In this way, a stable, and more particularly a tensile-resistant, coupling can be achieved.

A very large supporting surface can be implemented in a coupling device having three respective ramp sections on the head side and on the filter side. In this way, high mechanical loads, and more particularly tensile loads, can be compensated for.

The ramp grooves can advantageously adjoin each other circumferentially with respect to the coupling axis. The ramp grooves can thus be consecutively arranged with respect to the rotational movement for closing/opening the coupling device. The ramp grooves may be arranged without circumferential overlap. The ramp grooves can thus extend on the circumferential sides of the first coupling part in a space-saving manner.

Advantageously, the insertion ramp surfaces may optionally adjoin each other circumferentially with respect to the coupling axis. The insertion ramp surfaces can be arranged without circumferential overlap.

In a further advantageous embodiment, the coupling device can comprise at least one locking device having at least one head-side locking part and at least one filter-side locking part, which in the closed position of the coupling device can form an unlockable connection with each other. In this way, the closed coupling device can be mechanically secured at least when it is closed. The coupling device can thus be prevented from opening in an uncontrolled manner. The unlockable connection can advantageously be closed and/or opened without the use of a separate tool.

The unlockable connection can advantageously be a detent connection. A detent connection is easy to close and open. The detent connection can advantageously implement a mechanical resistance, which must be overcome to open the unlockable connection. The unlockable connection can thus be prevented from opening in an uncontrolled manner.

The unlockable connection, in particular the detent connection, can advantageously generate a signal, in particular a signal that can be detected acoustically and/or in a tactile manner, during locking. In this way, the closed state of the coupling device is easy to detect.

At least one of the locking parts, and more particularly at least one of the filter-side locking parts, can advantageously comprise a spring arm. The spring arm can advantageously be bent radially outwardly and/or radially inwardly in a spring-loaded manner with respect to the coupling axis. A catch lug or a detent seat can advantageously be provided at one free end of the spring arm. The at least one corresponding other locking part, and more particularly at least one of the head-side locking parts, can advantageously correspondingly comprise a detent seat or a catch lug. The detent seat or the catch lug of the spring arm can advantageously latchingly engage with the catch lug or detent seat of the other locking part in the locked position of the unlockable connection.

The at least one other locking part can advantageously have a guide surface. The guide surface can ascend in a ramp-like manner in the axial direction. The detent seat or catch lug may optionally be located at the end of the guide surface. During the rotational movement for closing the coupling device, the spring arm of the one locking part, in particular optionally the catch lug, can be guided on the guide surface of the other locking part.

The at least one spring arm can advantageously be arranged on the easy-change filter side. In this way, the spring arm can be replaced jointly with the easy-change filter. This allows fatigue on the movable spring arm to be prevented, which may occur as a result of multiple instances of opening and closing of the coupling device. The other locking part can advantageously be arranged on the filter head side.

The spring arm of the one coupling part can advantageously extend against a closing rotational direction of the easy-change filter relative to the filter head.

The spring arm can advantageously be preloaded, the preload being directed radially inwardly with respect to the coupling axis. The other locking part can advantageously be arranged on a circumferential side of the corresponding coupling part which is located radially outside with respect to the coupling axis.

The unlockable connection can advantageously be located outside an interior of the easy-change filter. Advantageously, it can be located on the outside of a cover body, in particular of a filter cover, of the easy-change filter. It may be visible from the outside when the easy-change filter is separated from the filter head. It is thus possible to identify before mounting the easy-change filter whether the at least one filter-side locking part, and more particularly the spring arm, is functional, in particular undamaged. The at least one filter-side locking part, and more particularly the at least one spring arm, can advantageously project beyond the cover body in the axial direction. The filter-side locking part can advantageously be located in a circumferential extension of ribs extending circumferentially. The filter-side locking part can thus be protected.

In a further advantageous embodiment, the coupling device can comprise at least one circumferential, with respect to the coupling axis, inner seal, which can provide sealing between the filter head and the easy-change filter at least axially with respect to the coupling axis and can separate a dirty side of the easy-change filter from a clean side. The inner seal can advantageously be an annular seal. It may have a round or angular, in particular rectangular, profile. The profile may be flat.

The inner seal can advantageously contribute to axial bracing of the coupling device. In this way, it is possible to damp vibrations between the easy-change filter and the filter head. Any potential noise development, in particular rattling, may thus be reduced.

The inner seal can advantageously be arranged coaxially with respect to the coupling axis. The axial sealing action can be improved during closing of the coupling device by a corresponding compression axial with respect to the coupling axis.

The inner seal may additionally act as a screw-on protector. After compression of the inner seal, a rotation of the easy-change filter relative to the filter head against the closing rotational direction may be made more difficult as a result of friction. In this way, the likelihood of the coupling device opening in an uncontrolled manner can be reduced.

The inner seal can advantageously be coupled to the easy-change filter. It may advantageously be secured to the easy-change filter. It may advantageously be arranged in an appropriate sealing groove on the easy-change filter. In this way, it is easy to captively preassemble.

Advantageously, the inner seal can be arranged on an end body of a filter element, and more particularly of a round filter element, of the easy-change filter. It may advantageously surround a through-opening to an element interior of the filter element. The element interior can be located on the clean side or the dirty side of the filter element. Correspondingly, the dirty side or the clean side can be located on the outside of the filter element.

The through-opening can advantageously be coaxial with respect to the coupling axis. It can advantageously be connected to a connecting channel. The connecting channel can advantageously extend coaxially with respect to the coupling axis at least in some sections. The connecting channel may be part of the filter head and/or of the head-side coupling part. The connecting channel can advantageously be connected to the at least one inflow or the at least one outflow for the fluid. This depends on whether a flow through the filter element from radially outside to radially inside, or vice versa, is possible.

A sealing surface for the inner seal can advantageously be provided on the filter head side. The sealing surface can advantageously be coaxial with respect to the coupling axis. The inner seal can be seated against the sealing surface in a planner and circumferentially closed manner. The sealing surface can advantageously surround the connecting channel.

The inner seal can advantageously be coaxial with respect to a potential center pipe of the easy-change filter. In this way, the inner seal can be supported against the center pipe in a stable manner in the axial direction.

In a further advantageous embodiment, a progression of ramp sections of the coupling parts can be adapted to an arrangement of the at least one outer seal such that, during closing of the coupling device by way of a plug-in and/or rotational movement, during an early closing phase, in particular during which second ramp sections of a second coupling part are located in a respective starting region of the ramp grooves of first ramp sections of the first coupling part, the at least one outer seal is located axially outside one of two sealing sections, in particular of a cylindrical outer sealing section, between which the outer seal provides sealing in the radial direction in the closed position of the coupling device, and during a later closing phase, during which the second ramp sections in particular engage in a respective end region of the ramp grooves, the outer seal is compressed between the two sealing sections. In this way, the outer seal can be relieved during the closing phase when the ramp sections are located outside or in the starting region of the ramp grooves. Loading, in particular compression, of the outer seal does not take place until the later closing phase when the ramp sections engage in the respective ramp grooves, and more particularly in the end regions of the same. In this way, a circumferential movement, in particular chafing, of the outer seal between the sealing sections, in particular between the head-side outer sealing section and the filter-side sealing groove, can be minimized. Mechanical loading of the outer seal, in particular wear, can thus be decreased. The slopes and/or the corresponding circumferential extensions of the ramp grooves and/or optionally of the insertion ramp surfaces can advantageously be adapted to the arrangement, in particular the position, of the outer seal.

The earlier closing phase can advantageously take place as the second ramp sections enter the ramp grooves. A first rotational angle during the rotation of the easy-change filter relative to the filter head, between the time at which the second ramp sections enter the ramp grooves and the early closing phase transitions to the late closing phase, can advantageously correspond approximately to a second rotational angle between the time at which the earlier closing phase transitions to the later closing phase and the later closing phase is completed.

If three ramp sections are used, the compression of the outer seal can advantageously begin following the time at which the second ramp sections enter the ramp grooves, subsequent to a rotation of the easy-change filter by approximately 60°. After the easy-change filter is rotated another 60°, the outer seal can be completely compressed.

The object is furthermore achieved according to the invention by the filter head in that the filter head comprises a head-side coupling part of a coupling device that can be closed and released by way of a plug-in and/or rotational movement with respect to a coupling axis, for an easy-change filter, in particular a spin-on filter according to the invention, wherein a filter head-side, radially inwardly directed sealing surface is provided for contact with an outer seal, which is arranged at the end face of a filter-side coupling part and at least extends around the periphery of a central opening and at least one fluid opening of a connecting body of the easy-change filter and which is directed radially outwardly so as to seal a fluid chamber formed between the easy-change filter and the filter head with respect to the surroundings when the easy-change filter is mounted to the filter head.

The advantages and features described above in connection with the spin-on filter according to the invention and the filtering device according to the invention and the advantageous embodiment of the same apply in corresponding fashion to the filter head according to the invention and the advantageous embodiments thereof, and vice versa.

BRIEF DESCRIPTION OF THE DRAWINGS

Additional advantages, features and details of the invention will be apparent from the description provided hereafter, which describes one exemplary embodiment of the invention in more detail based on the drawings. A person skilled in the art will expediently also individually consider the features that are disclosed in combination in the drawings, the description and the claims and combine them to form meaningful further combinations. In the schematic drawings:

In the figures, identical components are denoted by the same reference numerals.

DETAILED DESCRIPTION OF THE INVENTION

FIGS. 1 to 6 show a filter system 10 for engine oil of an internal combustion engine of a motor vehicle in different perspectives, sections and detailed views.

Figure 1:
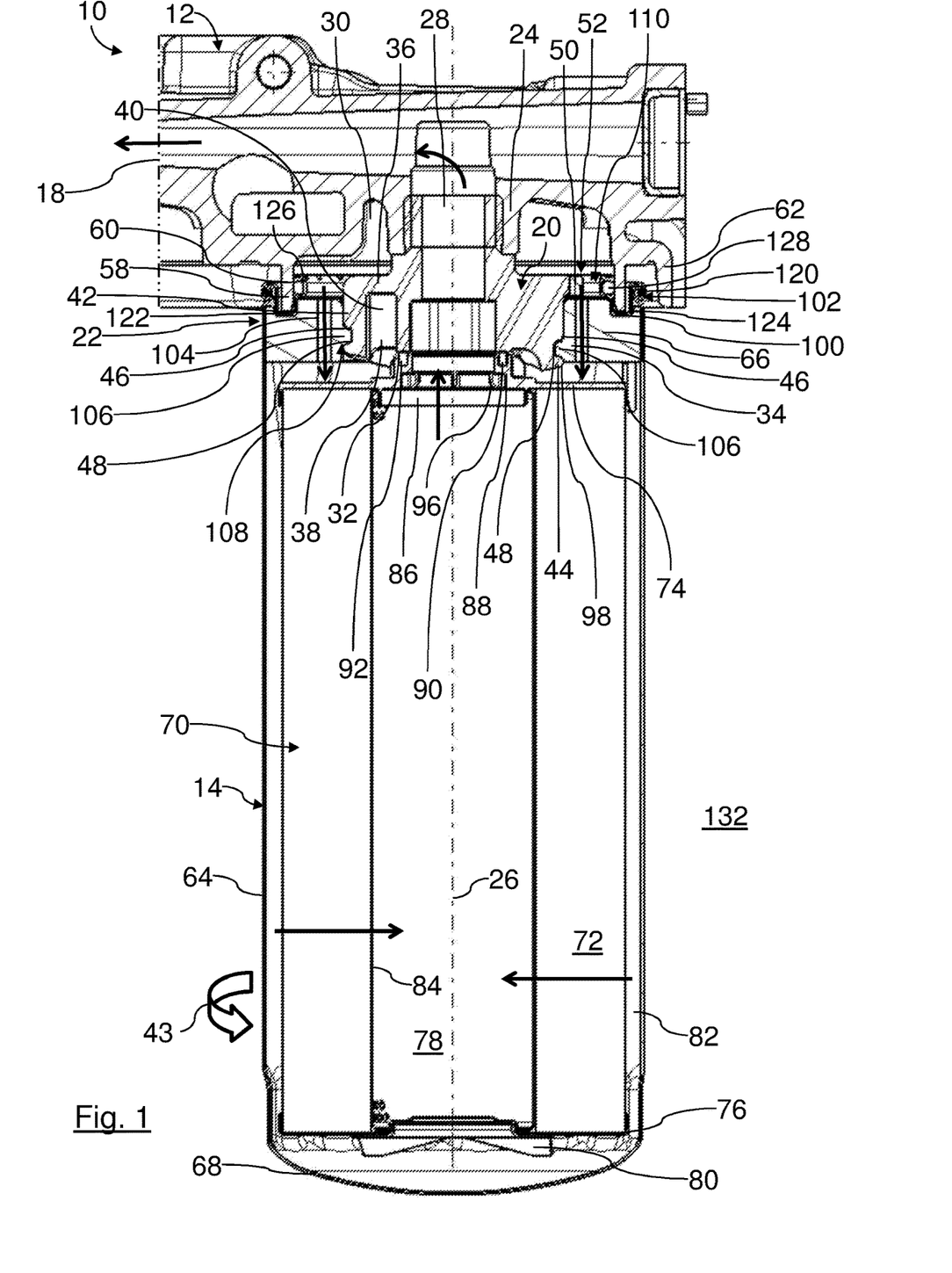
FIG. 1 shows a longitudinal section of a filter system for engine oil of an internal combustion engine of a motor vehicle, including a filter head to which an easy-change filter is secured by way of a releasable coupling device.

The filter system 10 comprises a filter head 12, to which an easy-change filter 14 is detachably secured. The filter head 12 is made of metal. The filter head 12 is rigidly coupled to the internal combustion engine and serves as a connecting part for the easy-change filter 14. The filter head 12 comprises an inlet 16 and an outlet 18 for the engine oil. The inlet 16 and the outlet 18 are connected to corresponding oil lines of the internal combustion engine in a manner that is not of further interest here.

The filter head 12 moreover comprises a head-side coupling part 20 of a releasable coupling device for coupling the easy-change filter 14 to the filter head 12, the coupling device being denoted in the overall by reference numeral 22. The head-side coupling part 20 is made of metal. The side of the head-side coupling part 20 facing the easy-change filter 14 has the shape and function of a connector. The head-side coupling part 20 is screwed into a hollow connecting cylinder 24, which is integrally joined to the filter head 12. The connecting cylinder 24 includes an internal thread. The connecting cylinder 24 is coaxial with respect to a filter axis 26. Instead of being screwed as a separate component to the filter head 12, the head-side coupling part 20 can also be integrally joined thereto.

When referring hereafter to "axial," "radial," "coaxial" or "circumferential," this description relates to the filter axis 26, unless indicated otherwise.

The head-side coupling part 20 comprises a cylindrical connecting sleeve section 28 having an external thread matching the internal thread of the connecting cylinder 24.

When the easy-change filter 14 is attached, the connecting sleeve section 28 is likewise coaxial with respect to the filter axis 26.

An interior of the connecting sleeve section 28 is connected to the outlet 18 of the filter head 12. The connecting sleeve section 28 has a single step on the radially inner circumferential side thereof. The inside cross-section of the connecting sleeve section 28 is approximately hexagonal on the expanded side facing the easy-change filter 14, wherein the corners are slightly rounded. The inside cross-section of an imaginary in circle on the side of the outlet 18 is smaller than the inside cross-section of the connecting sleeve section 28 on the side facing the easy-change filter 14.

The connecting cylinder 24 is surrounded on the radial outside by an inlet ring chamber 30 of the filter head 12.

An end face of the connecting sleeve section 28 facing the easy-change filter 14 forms an annular coaxial sealing surface 32.

The connecting sleeve section 28 of the head-side coupling part 20 is surrounded on the radial outside by an outer cylinder section 34. The circumferential wall of the outer cylinder section 34 has approximately the shape of a hollow circular cylinder. The outer cylinder section 34 is coaxial with respect to the filter axis 26. It extends in the axial direction approximately from the axial center plane of the connecting sleeve section 28 in the direction toward the end face of the connecting sleeve section 28 which faces the easy-change filter 14. On the side facing the filter head 12, the outer cylinder section 34 is integrally joined to the radially outer circumferential side of the connecting sleeve section 28 by way of a radial ring disk section 36.

A plurality of radial connecting walls 40 are arranged in an annular chamber 38 between the radially inner circumferential side of the outer cylinder section 34 and the radially outer circumferential side of the connecting sleeve section 28. The radial connecting walls 40 are each integrally joined on the radial outside to the outer cylinder section 34, and on the radial inside to the connecting sleeve section 28 and to a bottom side of the radial ring disk section 36. The radial connecting walls 40 each extend radially and axially. They are arranged in an approximately star-shaped manner seen in the direction of the filter axis 26.

A total of three head-side ramp sections 42 are arranged on the radially outer circumferential side of the outer cylinder section 34. The head-side ramp sections 42 are identical in terms of the expanses and shapes thereof. The head-side ramp sections 42 each extend helically with respect to the filter axis 26. A slope direction of the head-side ramp sections 42 corresponds to a known right-handed thread.

A closing rotational direction 43 of the easy-change filter 14 relative to the filter head 12, which is indicated by an arrow in FIGS. 1, 2, 4 and 6, for closing the coupling device 22 corresponds to that of a known right-handed thread. The closing rotational direction 43 extends clockwise from the easy-change filter 14 toward the filter head 12 seen in the axial direction.

The head-side ramp sections 42 each extend approximately across an angle of circumference of 240°. The head-side ramp sections 42 are arranged offset in relation to each other. Two of the head-side ramp sections 42 in each case overlap across half of the circumferential extensions thereof. The starting sections of the head-side ramp sections 42 are each located on the free end face of the outer cylinder section 34 which faces the easy-change filter 14. The ends of the head-side ramp sections 42 are each circumferentially located where the next but one head-side ramp section 42 begins, seen against the closing rotational direction 43.

Each head-side ramp section 42 is composed of two regions seen circumferentially. A first region including a respective insertion ramp surface 44 extends circumferentially from the starting section of a respective head-side ramp section 42 to the starting section of the respective next head-side ramp section 42, seen against the closing rotational direction 43. The insertion ramp surfaces 44 are freely accessible in the axial direction, seen from the easy-change filter 14. They each extend in the radial direction and helically in the circumferential direction. The insertion ramp surfaces 44 each extend in the radial direction across the entire radial wall thickness of the outer cylinder section 34.

A respective region including a groove ramp surface 46 adjoins the respective insertion ramp surface 44. The circumferential extension of the insertion ramp surface 44 corresponds to the circumferential extension of the groove ramp surfaces 46. They each extend across an angle of circumference of 120°. The groove ramp surfaces 46 are located on the radial outside of the outer cylinder section 34. The regions including the groove ramp surfaces 46 each overlap the subsequent head-side ramp sections 42, seen against the closing rotational direction 43. The groove ramp surface 46 of the front head-side ramp section 42, seen in the closing rotational direction 43, in each case overlaps the insertion ramp surface 44 of the subsequent head-side ramp section 42. The groove ramp surfaces 46 extend in the radial direction approximately across half the radial wall thickness of the outer cylinder section 34. The insertion ramp surfaces 44 transition without steps into the groove ramp surfaces 46. The groove ramp surfaces 46 have the same slope as the insertion ramp surfaces 44. Each of the groove ramp surfaces 46 starts, in the circumferential direction, at the level of the starting section of the respective subsequent clockwise head-side ramp section 42. The groove ramp surfaces 46 end at the level of the starting section of the respective circumferentially next but one head-side ramp section 42.

The groove ramp surfaces 46 delimit a respective ramp groove 48 on an axial side. On the axially opposing side, the ramp grooves 48 are each delimited by a head-side retaining surface 49 of the corresponding region of the subsequent head-side ramp section 42, the retaining surface being located axially opposite the insertion ramp surface 42. The ramp grooves 48 have a constant axial extension in the circumferential direction. Seen in the circumferential direction, the radial extension of the same is likewise constant.

Three detent elements 50 of a locking device of the coupling device 22 are arranged on the radially outer circumferential side of the outer cylinder section 34, the locking device being denoted in the overall by reference numeral 52. Each of the detent elements 50 is integrally joined to the outer cylinder section 34. The detent elements 50 are radial elevations. The detent elements 50 are arranged in the axial direction approximately at the level of the radial ring disk section 36.

Each of the detent elements 50 is approximately wedge-shaped. In a rear region with respect to the closing rotational direction 43 of the coupling device 22, each detent element 50 has a sloping guide surface 54. The guide surface 54 is provided at the radially outer circumferential side of the detent elements 50. A respective detent recess 56 adjoins the end of the guide surface 54. The radial expansion of the detent elements 50 is smaller in the region of the detent recess 54 than in the region of the end of the guide surface 54 which is elevated in the radial direction. Each detent element 50 extends circumferentially across an angle of circumference of approximately 25° to 30°. The transition from the guide surface 54 to the corresponding detent recess 56, seen circumferentially, is located approximately at one level with the end of one of the head-side ramp sections 42 and the start of the next but one head-side ramp section 42, seen against the closing rotational direction 43.

The connecting cylinder 24 and the head-side coupling part 20 are surrounded by a coaxial circular cylindrical outer sealing section 58. The free end face of the outer sealing section 58 faces the easy-change filter 14. The inside cross-section of this section increases toward the free end face thereof. The radially inner circumferential side of the outer sealing section 58 forms an outer sealing surface 60.

Furthermore, the filter bowl 12 comprises an outer collar 62, which extends in sections coaxially with respect to the filter axis 26 and surrounds the radial outside of the outer sealing section 58 over a portion of the circumference.

The easy-change filter 14 is designed as a spin-on filter having a round cross-section. It is substantially coaxial with respect to the filter axis 26. The easy-change filter 14 comprises a filter bowl 64, in the open side of which a filter cover 66 is secured. The filter bowl 64 has an outwardly curved filter bottom 68.

A coaxial filter element 70 is arranged in the filter bowl 64. The filter element 70 comprises a circumferentially closed filter medium 72 that is pleated in a zigzag manner. At the respective end faces, the filter medium 72 is sealingly connected to a connecting end cap 74, at the top, see FIG. 1, and a counter end cap 76, at the bottom.

Figure 2:
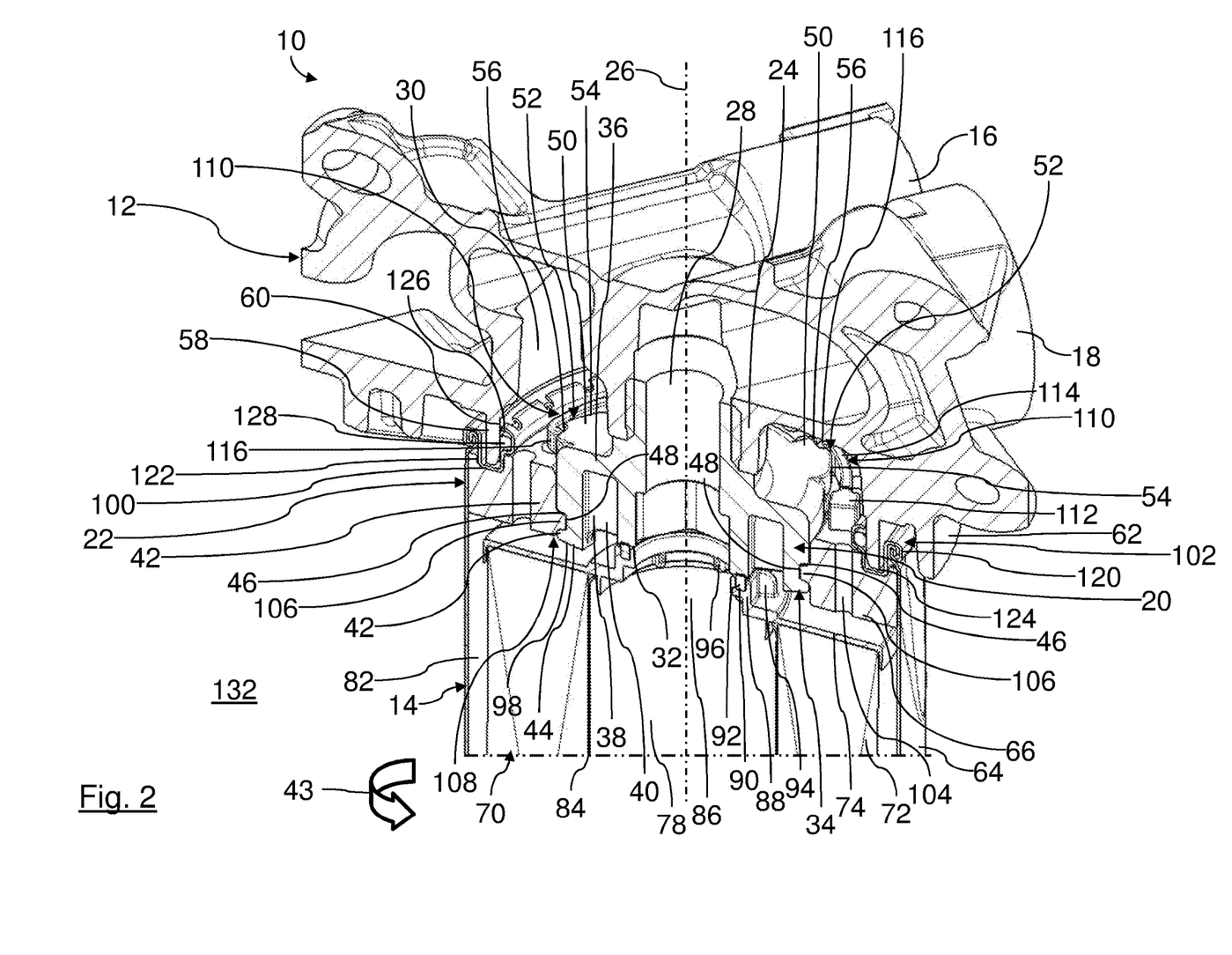
FIG. 2 shows a detailed view of another longitudinal section of the filter system of FIG. 1 in the region of the coupling device.
Figure 3:
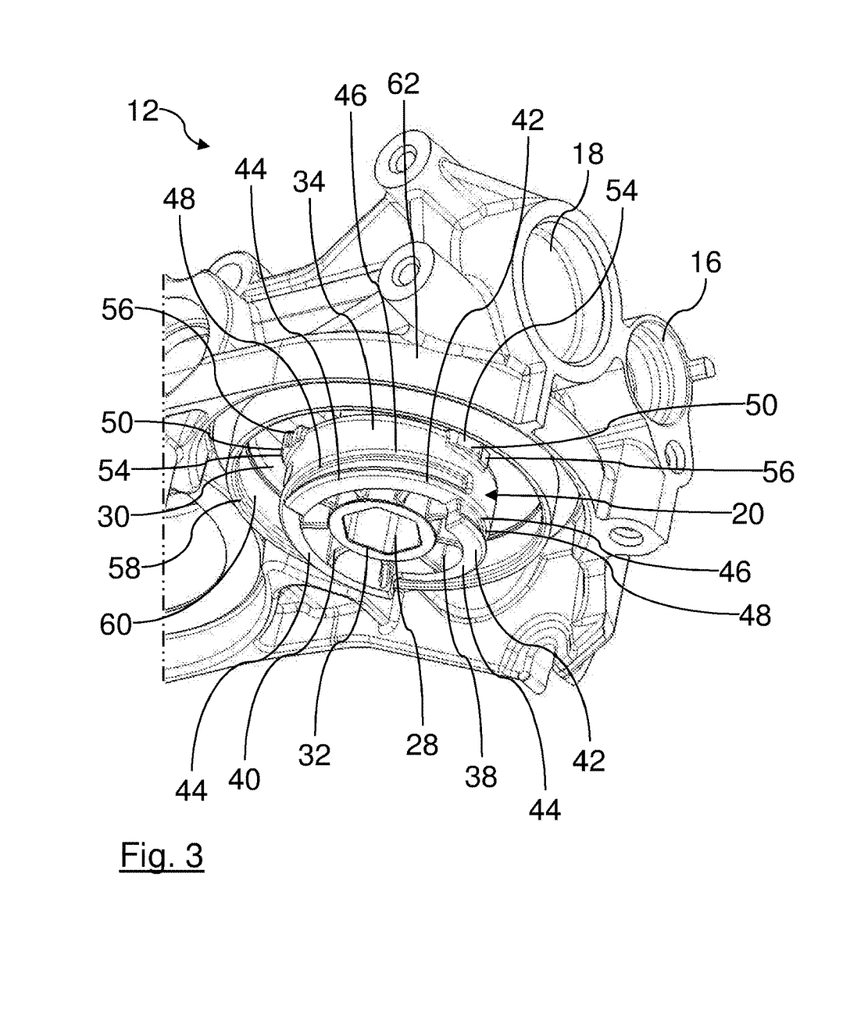
FIG. 3 shows an isometric representation of the filter head of FIGS. 1 and 2 without the easy-change filter, with a view onto the coupling side.
Figure 4:
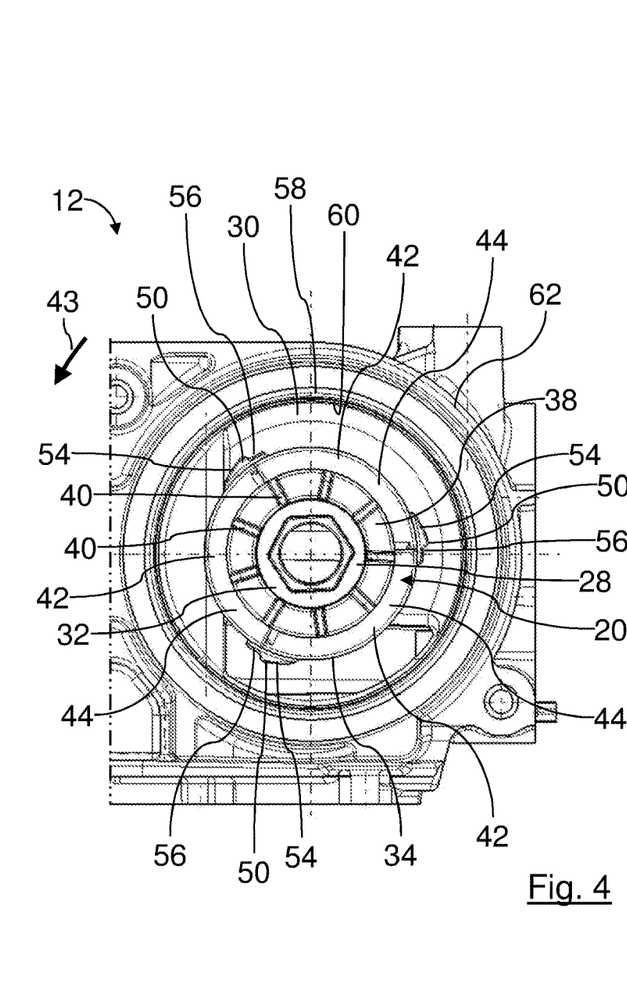
FIG. 4 shows a top view onto the coupling side of the filter head of FIGS. 1 to 3 without the easy-change filter.
Figure 5:
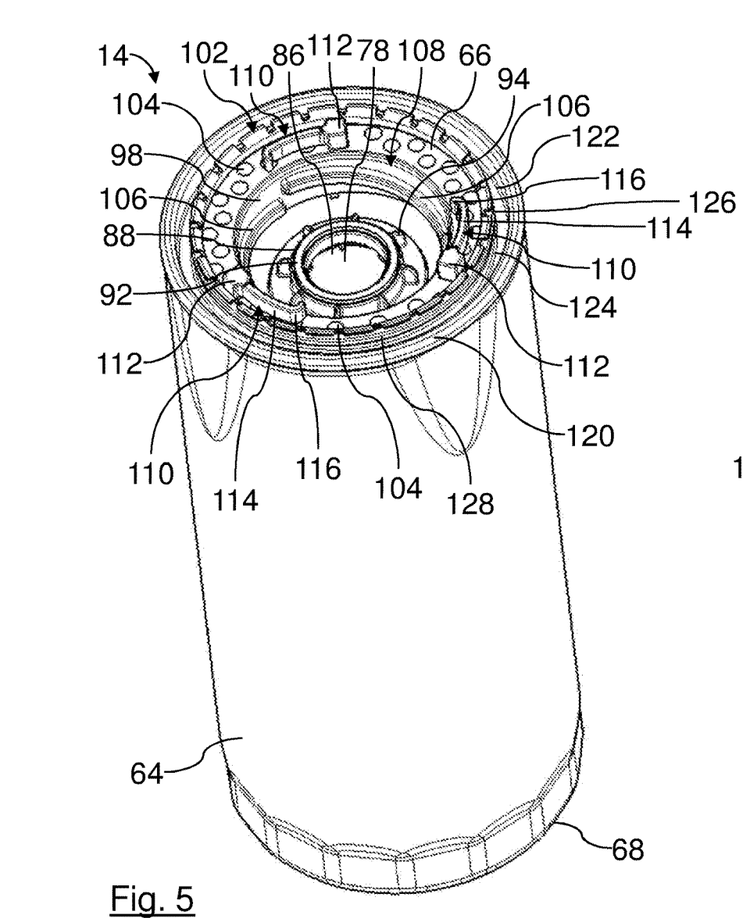
FIG. 5 shows an isometric representation of the easy-change filter of FIGS. 1 and 2, with a view onto the coupling side.
Figure 6:
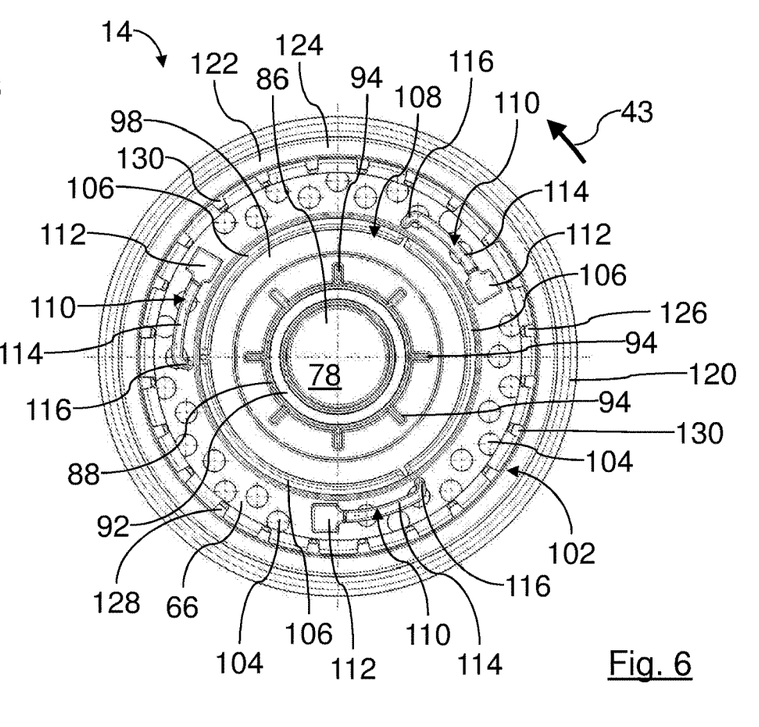
FIG. 6 shows a top view onto the coupling side of the easy-change filter of FIGS. 1, 2 and 5.

The connecting end cap 74 is shown in detail in FIGS. 2, 5 and 6. It is located on the side of the filter element 70 facing the filter cover 66. The filter medium 72 surrounds an element interior 78 of the filter element 70. The element interior 78 is located on a clean side of the filter element 70.

The counter end cap 76 closes the element interior 78 on the end face of the filter element 70 facing the filter bottom 68. Multiple spring elements 80 are supported on the outside of the counter end cap 76 which faces the filter bottom 78, and are supported on the other side on the spring bottom 68.

The filter element 70 is surrounded on the radial outside by a dirty-side annular chamber 82, which is delimited by the radially inner circumferential side of the filter bowl 64.

A coaxial center pipe 84 extends in the element interior 78 between the counter end cap 76 and the connecting end cap 74. A circumferential wall of the center pipe 84 is pervious to the engine oil. A radially inner circumferential side, which is to say radially inner pleated edges, of the filter medium 72 is supported on the radially outer circumferential side of the center pipe 84.

The connecting end cap 74 comprises a coaxial outlet opening 86 for the filtered engine oil. The outlet opening 86 forms a centric oil drain channel. A coaxial seal seat cylinder 88 is integrally provided on the axially outer side of the connecting end cap 74. A radially inner circumferential side of the seal seat cylinder 88 is stepped. On the end face facing away from the element interior 78, the seal seat cylinder 88 comprises a coaxial sealing groove 90 including an annular inner seal 92. The inner seal 92 is arranged offset axially with respect to the filter axis 26 in relation to the filter-side coupling part 108 toward the interior of the easy-change filter 14. The inner seal 92 is designed as a flat seal. The inner seal 92 has a sealing surface 93 extending around the outlet opening 86. When the easy-change filter 14 is mounted, the side of the inner seal 92 facing away from the element interior 78 is sealingly seated against the sealing surface 32 of the connecting sleeve section 28 of the head-side coupling part 20. The inner seal 92 acts in the axial direction. The inner seal 92 separates a dirty side of the filter element 70, radially outside the seal seat cylinder 88, in a sealed manner from a clean side, radially inside the seal seat cylinder 88. The smallest inside radius of the seal seat cylinder 88 corresponds approximately to the inside radius of an imaginary in circle of the connecting sleeve section 28 on the side having an expanded cross-section.

On the radial outside, the seal seat cylinder 88 is braced by way of supporting elements 94 against the radially extending section of the connecting end cap 74. The supporting elements 94 each extend radially and axially. In addition, inner supporting elements 96 are provided on the radially inner circumferential side of the seal seat section 88, bracing a ring section of the seal seat cylinder 88 that surrounds the sealing groove 90 on the radial inside.

The filter cover 66 has the shape of a ring having an approximately rectangular profile. The filter cover 66 is made of metal. The filter cover 66 has the function of a connecting plate for coupling the easy-change filter 14 to the filter head 12. The filter cover 66 includes a receiving opening 98 that is coaxial with respect to the filter axis 26, for receiving the outer cylinder section 34 of the head-side coupling part 20. Within the radially outer edge of the filter cover 66, a coaxial annular groove 100 is arranged on the outside facing away from the filter bottom 68 for accommodating a cover sheet metal ring 102. A plurality of inlet through-ports 104 are arranged radially between the annular groove 100 and the receiving opening 98. The inlet ports 104 each extend in parallel to the filter axis 46. They connect the inlet ring chamber 30 of the filter head 12 to the interior of the filter bowl 64, or the dirty-side annular chamber 82.

Three filter-side ramp sections 106 are arranged on the radially inner circumferential side of the filter cover 66. The ramp sections 106 implement respective coupling ribs. The filter-side ramp sections 106 each extend radially inwardly from the radially inner circumferential side of the filter cover 66. The extension and the circumferential progression of the filter-side ramp sections 106 are substantially identical. The sides of the filter-side ramp sections 106 facing the interior of the filter bowl 64 form respective filter-side retaining surfaces 107. The sides of the filter-side ramp sections 106 facing away from the interior of the filter bowl 64 form respective filter-side feed ramps 109. The filter-side retaining surfaces 107 and the feed ramps 109 run approximately parallel to each other. The filter-side ramp sections 106 each extend helically with respect to the filter axis 26, analogously to the head-side ramp sections 42. The slopes of the same correspond to those of the head-side ramp sections 42. The filter-side ramp sections 106 each extend across an angle of circumference of 120° with respect to the filter axis 26. The filter-side ramp sections 106 do not overlap. The starting sections 111 of the filter-side ramp sections 106 are located on the axial side facing away from the interior of the filter bowl 64. The starting sections 111 face the filter head 12 when the easy-change filter 14 is mounted. The starting sections 111 are spaced from a head-side radially inner edge of the filter cover 66 which faces away from the element interior 78 and surrounds the outlet opening 86. Seen circumferentially, the starting section 111 of each filter-side ramp section 106 is located at one level with the end of the preceding filter-side ramp section 106 in the closing rotational direction 43. The axial heights of the filter-side ramp sections 106 are constant across the circumference. They correspond to the axial heights of the ramp grooves 48 of the head-side ramp sections 42. The filter-side ramp sections 106 and the receiving opening 98 together form a filter-side coupling part 108 of the coupling device 22. The sealing surface 93 of the inner seal 92 is offset axially in relation to the filter-side coupling part 108 toward the filter element 70.

Three detent spring elements 110 are arranged on the outside of the filter cover 66 facing away from the interior of the filter bowl 64. The detent spring elements 110 are part of the locking device 52. Each of the detent spring elements 110 has a retaining section 112. The retaining section 112 is integrally joined to the filter cover 66 radially between the annular groove 100 and the receiving opening 98. A respective spring arm section 114 of the detent spring elements 110 is integrally joined to the retaining section 112. The spring arm sections 114 are each located on the front side of the retaining sections 112, seen in the closing rotational direction 43. The spring arm sections 114 each extend circumferentially across an angle of circumference of approximately 30°. The spring arm sections 114 can be bent outwardly in a spring-loaded manner on the retaining sections 112 in the radial direction. At the respective free ends facing away from the retaining sections 112, each of the spring arm sections 114 transitions into a catch lug 116. The catch lugs 116 extend radially inwardly. Each of the catch lugs 116 is located on the same circumferential side as a starting section 111 of one of the filter-side detent sections 106 and an end of the respective preceding filter-side ramp section 106.

The cover sheet metal ring 102 has a profile that is bent multiple times. The radially outer circumferential side of the ring is rigidly connected to a free edge of the filter bowl 64 by way of a crimped joint 120. The crimped joint 120 is a shaped crimp. The cover sheet metal ring 102 serves as an attachment ring of the filter cover 66 to the filter bowl 64. Radially inside the crimped joint 120, the cover sheet metal ring 102 has an approximately rectangular, circumferentially closed first bending section. In the region of the first bending section, the cover sheet metal ring 102 comprises a collar 122, which engages in the annular groove 100 of the filter cover 66, on the side facing the filter cover 66.

On the outside of the cover sheet metal ring 102 facing away from the filter cover 66, the collar 122 forms a receiving groove 124 for the outer sealing section 58 of the filter head 12.

The radially inner circumferential side of the cover sheet metal ring 102 is bent to form a U-shaped profile, the opening of which points radially outwardly. The U-shaped profile includes a coaxial, circumferentially closed sealing groove 126. An outer seal 128 is arranged in the sealing groove 126. The sealing groove 126 is thus a seal seat groove. The outer seal 128 projects axially toward the filter head 12 beyond a circumferential surface section 129. The surface section 129 forms the base of the annular groove 100. The surface section 129 extends radially and circumferentially. The surface section 129 adjoins the outer seal 128 radially outwardly on the side of the filter cover 66 facing the filter head 12. The outer seal 128 is arranged below the side of the crimped joint 120 which faces the filter head 12. The outer seal 128 is an O-ring seal. The outer seal 128 is oriented radially outwardly with respect to the filter axis 26. The outer seal 128 acts in the radial direction.

On the inside edge facing axially away from the filter cover 66, the cover sheet metal ring 102 comprises a plurality of notches 130 distributed over the circumference.

When the easy-change filter 14 is mounted, the outer seal 128 is sealingly seated against the axially extending radially inward outer cylindrical sealing surface 60 of the outer sealing section 58. The outer seal 128 separates the dirty side of the filter element 70, or the inlet ring chamber 30, from the surroundings 132.

For coupling to the filter head 12, the easy-change filter 14 is initially moved, with the filter cover 66 first, axially with respect to a coupling axis, which in the exemplary embodiment coincides with the filter axis 26, toward the head-side coupling part 20 of the filter head 12 in a plug-in movement.

The outer cylinder section 34 is plugged into the receiving opening 98 of the filter cover 66 until the filter-side ramp sections 106 axially abut the insertion ramp surfaces 44 of the head-side ramp sections 42. The outer sealing section 58 is located axially remote from the outer seal 128.

Using a rotational movement of the easy-change filter 14 in the closing rotational direction 43, the filter-side coupling part 108 is screwed into the head-side coupling part 20. In this process, the respective filter-side ramp sections 106 engage in one of the ramp grooves 48. Following a rotational angle of 60° from the time at which the filter-side ramp sections 106 begin to be lowered into the ramp grooves 48, the outer seal 128 begins to be seated against the outer sealing surface 60 of the outer sealing section 58 and is guided in the inlet region having an expanded cross-section when the easy-change filter 14 is rotated further.

Following further rotation by 60°, the front ends, in the closing rotational direction 43, of the filter-side ramp sections 160 abut the rear ends of the ramp grooves 48. The ends of the ramp grooves 48 form stops, which prevent the easy-change filter 14 from being rotated further when the coupling device 22 is closed.

When the coupling device 22 is closed, the inner seal 92 is sealingly seated against the sealing surface 32 of the connecting sleeve section 28 in a radially compressed manner.

In an end phase of the closing movement, the catch lugs 116 of the spring arm sections 114 of the detent spring elements 110 furthermore abut the respective rear ends, in the closing rotational direction 43, of the guide surfaces 54 of the detent elements 50. When the easy-change filter 14 is rotated further in the closing rotational direction 43, the catch lugs 116 are guided on the guide surfaces 54. When the coupling device 22 is closed, the catch lugs 116 latchingly engage the respective detent recesses 56 of the detent elements 50. The latching engagement of the catch lugs 116 generates an audible sound.

The latchingly engaged catch lugs 116 make it more difficult to open the coupling device 22 by rotating the easy-change cylinder 14 against the closing rotational direction 43. Moreover, the compressed inner seal 92 makes it more difficult to open the coupling device 92 as a result of friction.

The easy-change filter 14 is removed from the filter head 12 by rotating the easy-change filter 14 against the closing rotational direction 43. For this purpose, initially the spring force of the spring sections 114 and the frictional force between the inner seal 92 and the sealing surface 32 must be overcome.

During operation of the filter system 10, the engine oil to be filtered is fed through the inlet 16 of the filter head 12 to the inlet ring chamber 30. From there, the engine oil reaches the dirty-side annular chamber 82 of the easy-change filter 14 through the inlet ports 104. The engine oil to be filtered flows through the filter medium 72 from the radial outside to the radial inside and is purified. The purified engine oil leaves the element interior 78 through the outlet opening 86 and reaches the interior of the connecting sleeve section 28, which serves as a fluid connector having an oil duct. The interior of the connecting sleeve section 28 thus fluidically communicates with the outlet opening 86. From there, the purified engine oil flows into the outlet 18 of the filter head 12 and leaves the filter system 10.

In an alternative design of the filtering device, it is possible to provide inlet ports on the filter head 20, and specifically on the ring disk section 36 of the connecting sleeve section 28, so that the untreated fluid can flow through head-side inlet ports into the filter, as an alternative or in addition to the inlet via the inlet ports 104.

What is claimed is:

1. A spin-on filter (14) for a filtering device (10) for fluid, the spin-on filter (14) comprising:
   a housing pot (64), in which a filter element (70) is arranged;
   a connecting body (66), which is arranged on an end face of the housing pot (64) having
      a central opening (98); and
      at least one fluid opening (104) that is radially outwardly offset in relation to the central opening (98);
   a filter-side coupling part (108) of a coupling device (22) for detachably coupling the spin-on filter (14) to a filter head (12) of the filtering device (10), the coupling part being arranged on the central opening (98);
   wherein the filter-side coupling part (108) is configured to be detachably coupled to a connector of a head-side coupling part (20) of the filter head (12) of the filtering device (10) by way of a plug-in and/or rotational movement with respect to a coupling axis (26);
   wherein at the end face an outer seal (128) is provided, which at least extends around the periphery of the central opening (98) and the at least one fluid opening (104) and which is directed radially outwardly for contact with an axially extending radially inwardly directed cylindrical sealing surface (60) on the filter head side so as to seal a fluid chamber (30) formed between the spin-on filter (14) and the filter head (12) with respect to a surroundings when the spin-on filter (14) is mounted to the filter head (12) wherein the filter-side coupling part (108) comprises a plurality of coupling ribs (106) which are distributed in a circumferential direction of the coupling axis (26) on the central opening (98).

2. The spin-on filter according to claim 1, wherein a radially outwardly open seal receiving groove (126) is formed at least partially by an attachment ring (102) of the connecting body (66), which can be coupled to the edge of the housing pot (64) in a form-locked manner by way of a shaped crimp (120).

3. The spin-on filter according to claim 1, wherein the outer seal (128) projects axially toward the filter head (12) beyond a circumferential surface section (129) that adjoins the outer seal (128) radially outwardly on the side of the connecting body (66) which faces the filter head (12).

4. The spin-on filter according to claim 2, wherein the outer seal (128) is arranged beneath a side of the form-locked joint facing the filter head (12) between an edge of the housing pot (64) and the attachment ring (102) of the shaped crimp (120).

5. The spin-on filter according to claim 1, wherein the coupling device (22) comprises at least one circumferential, with respect to the coupling axis (26), inner seal (92).

6. The spin-on filter according to claim 5, wherein the inner seal (92) is arranged offset axially with respect to the coupling axis (26) in relation to the filter-side coupling part (108) toward an interior of the spin-on filter (14).

7. A filtering device (10) for fluid, comprising:
   a filter head (12);
   a spin-on filter (14) according to claim 1, comprising:
      a housing pot (64), in which a filter element (70) is arranged;

a connecting body (66), which is arranged at an end face of the housing pot (64) and is provided with a central opening (98), and with at least one fluid opening (104) that is radially outwardly offset in relation to the central opening (98);
a filter-side coupling part (108) of a coupling device (22) detachably coupling the spin-on filter (14) to the filter head (12) of the filtering device (10), the coupling part being arranged on the central opening (98); and
wherein the filter-side coupling part (108) is detachably coupled to a connector of a head-side coupling part (20) of the filter head (12) of the filtering device (10) by way of a plug-in and/or rotational movement with respect to a coupling axis (26); and
wherein at the end face an outer seal (128) is provided, which at least extends around the periphery of the central opening (98) and the at least one fluid opening (104) and which is directed radially outwardly contacting an axially extending radially inwardly directed cylindrical sealing surface (60) on the filter head side so as to seal a fluid chamber (30) formed between the spin-on filter (14) and the filter head (12) with respect to a surroundings when the spin-on filter (14) is mounted to the filter head (12) wherein the filter-side coupling part (108) comprises a plurality of coupling ribs (106) which are distributed in a circumferential direction of the coupling axis (26) on the central opening (98).

8. The filtering device according to claim 7, wherein the at least one outer seal (128) provides sealing with respect to the coupling axis (96) exclusively in the radial direction.

9. The filtering device according to claim 8, wherein the at least one outer seal (128) is an O-ring seal.

10. The filtering device according to claim 7, wherein the at least one outer seal (128) is attached to a side of the spin-on filter (14).

11. The filtering device according to claim 7, wherein a corresponding sealing surface (60), with which the at least one outer seal (128) can sealingly cooperate, is arranged on the side of the filter head (12).

12. The filtering device according to claim 7, wherein the sealing surface (60) is arranged on a corresponding outer sealing section (58) on the side of the filter head (12).

13. The filtering device according to claim 7, wherein the at least one outer seal (128) is arranged in a seal seat (126).

14. The filtering device according to claim 7, wherein a first of the coupling part (20) comprises at least two first ramp sections (42) extending helically with respect to the coupling axis (26);
a second coupling part (108) comprises at least two second ramp sections (106) extending helically with respect to the coupling axis (26), which are guided against each other at least for closing the coupling device (22).

15. The filtering device according to claim 7, wherein the coupling device (22) comprises at least one locking device (52) having at least one head-side locking part (50) and at least one filter-side locking part (110), which in the closed position of the coupling device (42) can form an unlockable connection with each other.

16. The filtering device according to claim 7, wherein the coupling device (22) comprises at least one circumferential, with respect to the coupling axis (26), inner seal (92) which can provide sealing between the filter head (12) and the spin-on filter (14) at least axially with respect to the coupling axis (26) and can separate a dirty side (82) of the spin-on filter (14) from a clean side (78).

17. The filtering device according to claim 7, wherein a progression of ramp sections (42, 106) of the coupling parts (20, 108) is adapted to an arrangement of the at least one outer seal (128) such that, during closing of the coupling device (42) by way of a plug-in and/or rotational movement, during an early closing phase in which second ramp sections (106) are located in a respective starting region of ramp grooves (48) of first ramp sections (42) of the first coupling part (20), the at least one outer seal (128) is located axially outside one of two sealing sections (58, 126) of a cylindrical outer sealing section (58), between which the outer seal provides sealing in the radial direction in the closed position of the coupling device (22), and during a later closing phase, during which the second ramp sections (106) engage in a respective end region of the ramp grooves (48), the outer seal is compressed between the two sealing sections (58, 126).

18. A filter head (12) of a filtering device (10) for fluid according to claim 7, wherein
the filter head (12) comprises a head-side coupling part (20) of a coupling device (22) that can be closed and released by way of a plug-in and/or rotational movement with respect to a coupling axis (26), for a spin-on filter (14), the spin-on filter (14) comprising:
a housing pot (64), in which a filter element (70) is arranged;
a connecting body (66), which is arranged on an end face of the housing pot (64) having
a central opening (98); and
at least one fluid opening (104) that is radially outwardly offset in relation to the central opening (98);
a filter-side coupling part (108) of a coupling device (22) for detachably coupling the spin-on filter (14) to a filter head (12) of the filtering device (10), the coupling part being arranged on the central opening (98);
wherein the filter-side coupling part (108) is configured to be detachably coupled to a connector of a head-side coupling part (20) of the filter head (12) of the filtering device (10) by way of a plug-in and/or rotational movement with respect to a coupling axis (26);
wherein at the end face an outer seal (128) is provided;
wherein a radially inwardly directed sealing surface (60) on the filter head side is provided for contact with the outer seal (128), which is arranged at the end face of a filter-side coupling part (108) and at least extends around the periphery of a central opening (98) and at least one fluid opening (104) of a connecting body (66) of the spin-on filter (14) and which is directed radially outwardly so as to seal a fluid chamber (30) formed between the spin-on filter (14) and the filter head (12) with respect to the surroundings when the spin-on filter (14) is mounted to the filter head (12).

19. The spin-on filter according to claim 1, wherein the radially inwardly directed sealing surface (60) on the filter head side has a smaller diameter than the diameter of the housing pot (64).

* * * * *